United States Patent [19]

Bozzo

[11] Patent Number: 4,663,807

[45] Date of Patent: May 12, 1987

[54] REUSABLE CLIP

[76] Inventor: Michael J. Bozzo, 1557 Langdon Dr., Centerville, Ohio 45459

[21] Appl. No.: 852,349

[22] Filed: Apr. 15, 1986

Related U.S. Application Data

[63] Continuation-in-part of Ser. No. 754,829, Apr. 12, 1985, abandoned.

[51] Int. Cl.⁴ .............................................. B65D 77/10
[52] U.S. Cl. ............................. 24/30.5 R; 24/16 PB; 24/20 TT; 24/30.5 P
[58] Field of Search .......... 24/30.5 R, 30.5 P, 30.5 T, 24/30.5 W, 30.5 S, 20 TT, 16 R, 16 PB, 17 AP, 570, 571; 248/74.3, 73

[56] References Cited

U.S. PATENT DOCUMENTS

| | | |
|---|---|---|
| 1,780,880 | 3/1930 | Johnson . |
| 3,043,547 | 7/1962 | Reich ............................ 24/30.5 T |
| 3,112,542 | 5/1961 | Brunson . |
| 3,571,861 | 3/1971 | Olson ............................ 24/30.5 P |
| 3,605,200 | 11/1969 | Vallinotto et al. . |
| 3,913,187 | 10/1975 | Okuda ............................ 24/16 PB |
| 3,925,851 | 7/1978 | Bevans . |
| 3,944,177 | 3/1976 | Yoda ............................ 248/74.3 |
| 4,097,967 | 7/1978 | Conner, Jr. . |
| 4,128,918 | 12/1978 | Wenk . |
| 4,183,120 | 1/1980 | Thorne . |
| 4,295,618 | 10/1981 | Morota et al. ............................ 248/73 |
| 4,306,740 | 12/1981 | Kleykamp et al. ............... 24/20 TT |
| 4,372,011 | 2/1983 | Aranyos . |
| 4,502,186 | 3/1985 | Clarke et al. ............................ 24/20 TT |

FOREIGN PATENT DOCUMENTS

| | | | |
|---|---|---|---|
| 1230280 | 9/1960 | France ............................ 248/73 |
| 1567852 | 5/1980 | United Kingdom ............ 24/16 PB |

*Primary Examiner*—Victor N. Sakran
*Attorney, Agent, or Firm*—Roger S. Dybvig

[57] ABSTRACT

A reusable closure clip formed in one piece from compliant molded plastic and having two side-by-side handles, each including a closed loop, the adjacent sidewalls of which are connected at their lower ends by a hinge formed from a short, arcuate ribbon of the plastic. Each handle is provided with a post extending generally above the outside wall of the handle loop and with an outwardly facing pressure pad on the post, also generally above such outside wall. In use, a squeezing pressure may be applied to the pressure pads to bring the inside handle walls toward one another to grip the article to be clipped. The clip is held retained to an article by interfitting, serrated jaw members, which may be released from one another by twisting one of the handles.

17 Claims, 8 Drawing Figures

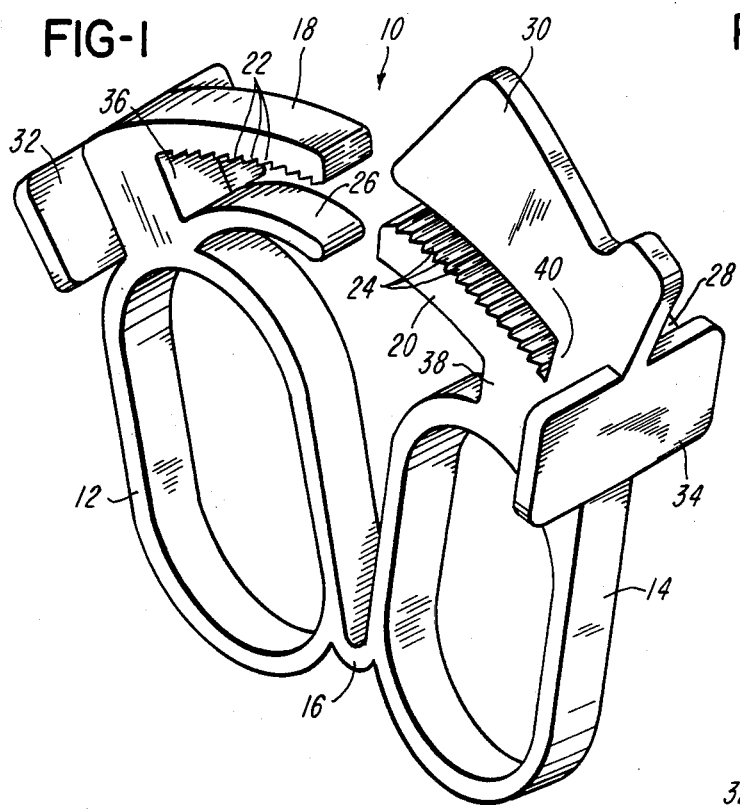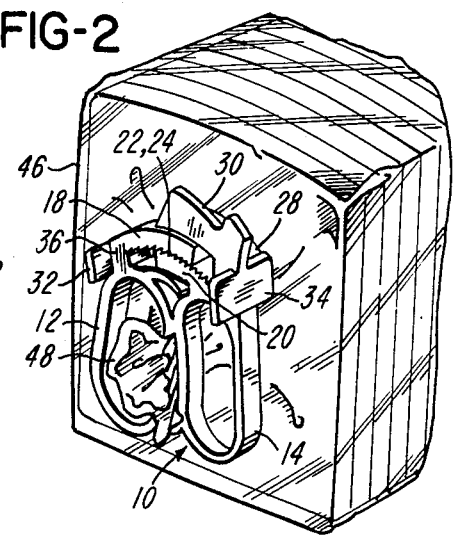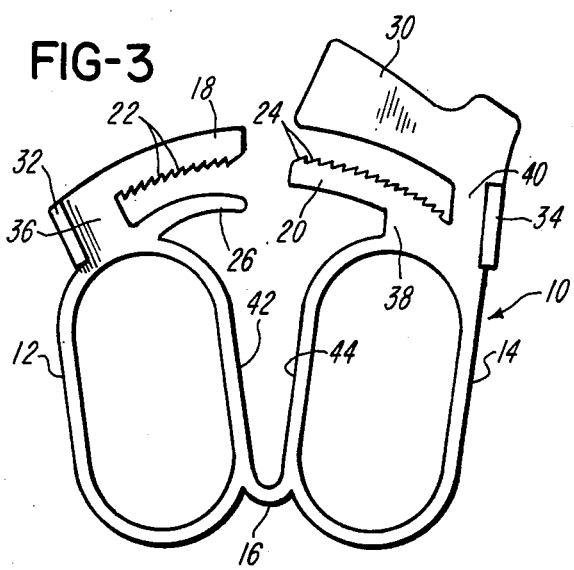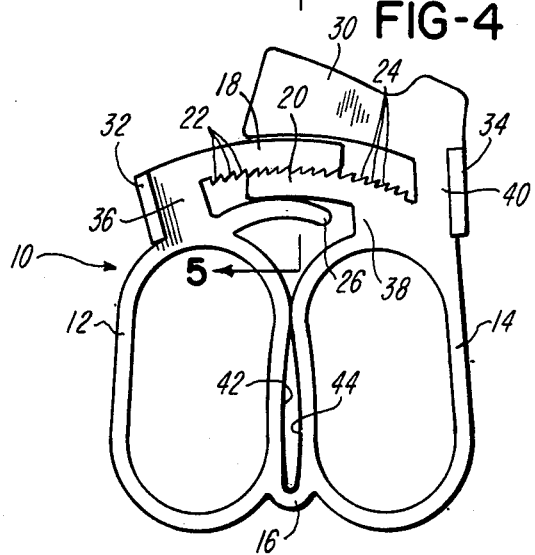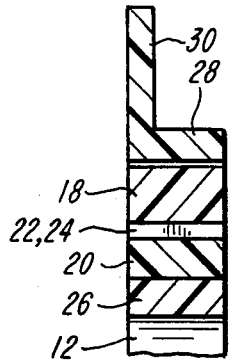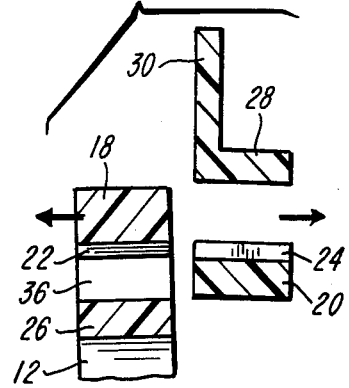

4,663,807

REUSABLE CLIP

CROSS-REFERENCE TO RELATED APPLICATION

This application is a continuation-in-part of application Ser. No. 754,829, titled "Clip", filed July 12, 1985, by Michael J. Bozzo, now abandoned.

SUMMARY OF THE INVENTION

This invention relates to a reusable clip primarily intended to be used to close and seal a paper or plastic bag, such as a bread bag, but the invention is not so limited and may be used for many other purposes, such as for clipping different articles together or for clamping articles, such as rubber or the like fluid delivery tubes.

A primary object of this invention is to provide a reusable clip that is rugged, long lasting, reliable, easy to clip, and easy to unclip. Another object of this invention is to provide a clip that a person may conveniently and comfortably hold in one hand between the fingers and base of the thumb, and easily and with little effort manipulate to grip an article.

In accordance with this invention, a reusable clip comprises a compliant, one-piece plastic molding having two handles integrally joined by a shared hinge. Each handle comprises a body that preferably has a generally rectangular, but somewhat oval, shape, comprising two, longer, substantially straight, mutually parallel side walls and two, shorter, arcuate or semicircular end walls joining to the opposite ends of the side walls. One of the side walls, termed the inside wall herein, of one handle is closely adjacent to and confronting the inside wall of the other handle. The hinge comprises a short, arcuate ribbon of plastic joining the two handles at the lower ends of their adjacent inside walls and so constructed that the handles are positioned relative to one another with the upper and lower faces of one handle substantially coplanar with the corresponding faces of the other handle. Each handle body may usefully, attractively, and inexpensively be formed as a closed loop from a ribbon of plastic.

Each handle is provided with a post extending generally above the outside wall of the handle body and with an outwardly facing pressure pad on the post, also generally above such outside wall. In use, a squeezing pressure may be applied to the pressure pads to bring the inside handle walls toward one another to grip the article to be clipped. The connecting hinge between the handles acts as a fulcrum for a lever system that includes the two handles. Since the pressure pads are located above the outside walls of the handle bodies, and are thus spaced further from the hinge than the inside walls, a substantial mechanical advantage is obtained so that the little force must be applied to the pressure pads to obtain an adequate gripping force between the inside walls.

Further in accordance with this invention, means are provided on top of the handles and preferably between the pressure pads for releasably holding the inside walls in their article gripping positions. Such means is preferably capable of accomodating different separations between the pressure pads so that the differences in the sizes of the articles to be clipped, or the forces with which they are gripped, may also be accomodated. This means may comprise a serrate jaw on top of each handle body generated circularly generally about the axis of the hinge. The serrate jaws are so positioned as to slideably interfit as the handles are moved toward each other, with at least one serration of one jaw interfitting between adjacent serrations of the other jaw. Arcuate ribs are provided for guiding the serrate jaws to an interfitting position. The jaws are preferably located substantially in line with and between the pressure pads so that they will not be subjected to off-center forces that, due to the compliant nature of the plastic material from which the clip is made, could adversely affect their reliability.

Movement of the inside walls toward one another is best accomplished by holding the clip in one hand between two or three fingers, which engage the outer part of one handle, and the pad at the base of the thumb, which engages the outer part of the other handle, and squeezing the handles toward one another by moving the fingers and the thumb with essentially the same movement one uses to initiate the forming of a fist. Manipulation of the handles toward each other in this manner has been found to be easier and more comfortable than squeezing the inside walls between the tips of the thumb and forefinger, which one may do if the handle bodies are closed loops. In one embodiment, which is presently preferred, means are provided within each handle loop to discourage or prevent those that may not be familiar with the best mode of manipulation from directly gripping the inside walls between the tips of the thumb and forefinger. With such means, one will tend to squeeze properly on the pressure pads and thereby make use of the designed mechanical advantage. Such means may comprise an integrally molded spider located within the handle loops that make it difficult to grip the inside walls.

Another object of this invention is to provide a clip that may be easily unclipped from an article. To this end, one of the handles has a flange extending above its jaw for finger manipulation to separate the interfitting jaws by moving the one handle relative to the other handle so that the interfitting jaws are separated.

Other objects and advantages will become apparent from the following description and the drawings.

BRIEF DESCRIPTION OF THE DRAWINGS

FIG. 1 is a perspective illustration of a clip in accordance with the present invention.

FIG. 2 is a perspective illustration of the clip of FIG. 1 operatively attached to the twisted end of a bread bag.

FIG. 3 is a plan view of the clip when open.

FIG. 4 is a plan view of the clip when closed.

FIG. 5 is a fragmentary section view taken substantially along the line 5—5 of FIG. 4.

FIG. 6 is a fragmentary section view analogous to FIG. 5 but showing the clip after separation of its jaws, with arrows indicating the direction of the separating forces.

DETAILED DESCRIPTION

Figure 7:
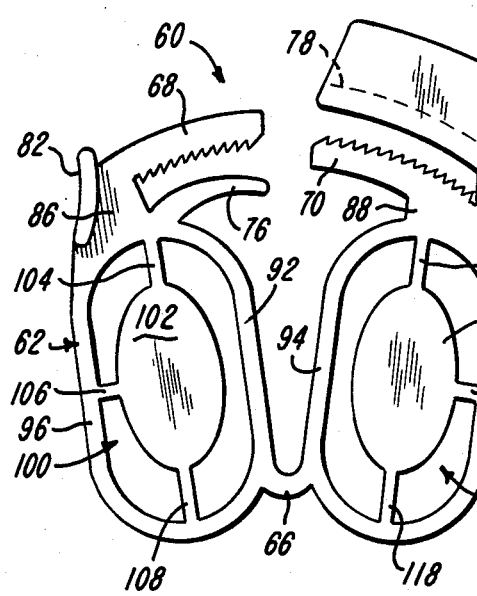
FIG. 7 is a plan view similar to FIG. 3, but illustrating another and presently preferred embodiment of this invention when open.

Referring to FIGS. 1 to 6, a clip in accordance with this invention is identified generally by the reference number 10 and comprises a one-piece molded plastic body. Included in this one-piece molded body are a pair of finger or hand engageable handles 12 and 14. The handles 12 and 14 each have a body formed from a ribbon of plastic as a closed loop and having a generally rectangular, but somewhat oval, shape, comprising two, longer, substantially straight, mutually parallel inside and outside walls and two, shorter, arcuate or semicircular end walls joining to the opposite ends of the side walls. The inside wall, designated 42, of the handle 12 is closely adjacent to and confronting the inside wall, designated 44, of the other handle 14. The handles 12 and 14 are linked by a flexible hinge 16 molded in one piece with the handles 12 and 14. The hinge 16 comprises a short, arcuate ribbon of plastic joining the two handles 12 and 14 at the lower ends of their adjacent inside walls 42 and 44 and so constructed that the handles 12 and 14 are positioned relative to one another with the upper and lower faces of one handle substantially coplanar with the corresponding faces of the other handle.

Disposed on the top part of the handle 12 is a serrate jaw 18 spaced above the handle 12 by a molded post 36 that extends generally above the outside wall of the handle 12. The post 36 establishes a fixed separation between the serrate jaw 18 and the upper curved end of the handle 12.

Also formed as one piece with the post 36 is an arcuate rib 26 which defines an opening between itself and the serrations or teeth 22 present on the jaw 18. The rib 26 and the serrate jaw 18 are each curved so as to follow a circular curve generated about an axis which is approximately coincident with the axis about which the hinge 16 flexes, with the circular curve for the serrate jaw 18 being at a greater distance from the hinge axis than is the arcuate rib 26.

Formed atop the handle 14 is a second serrate jaw 20 supported by a post 38 that extends generally above the outside wall of the handle 14. Projecting outwardly adjacent the post 38 is a taller post 40 that extends generally above the outside wall of the handle 14 and that supports an arcuate rib 28. As was the case with the serrate jaw 18 and the rib 26, the serrate jaw 20 and the rib 28 follow similar but spaced-apart curves, each generated approximately about the axis of the hinge 16.

The arrangement is such that the serrate jaw 18 with its serrations 22 can enter the space between the rib 28 and the serrate jaw 20 with its serrations 24. The serrations of the jaw 18 are sloped toward the post 36 and the serrations of the jaw 20 are sloped toward the post 40 and this sloping of the serrations enables the serrations 22 to slide easily over the serrations 24. So that the present invention has a generally symmetrical appearance, the serrate jaws 18 and 20 have nearly equal numbers of teeth. It is to be appreciated, however that either of the two jaws needs only one tooth or serration which can slide over plural teeth located on the other jaw so as to supply an adjustable closure.

Integrally formed adjacent the outside wall of the post 36 is an outwardly facing, transversely extending pressure pad 32. Also integrally formed adjacent to the outside wall of the post 40 is an outwardly facing, transversely extending pressure pad 34. The two pressure pads 32 and 34 provide surfaces against which an operator may apply finger pressures so as to force the serrate jaw 18 into the opening between the serrate jaw 20 and the arcuate rib 28. Since the serrations 22 easily slide over the favorably sloped serrations 24, the jaw 18 slips easily into the opening as the hinge 16 yields to accomodate the movement of the handle 12 toward the handle 14. Of course, at the same time, the serrate jaw 20 penetrates into the opening underlying the serrate jaw 18. More importantly, the confronting inside walls, designated 42 and 44 of the handles 12 and 14, respectively, are caused to approach one another as the serrate jaws enter their respective openings with the extent of such approach depending on the extent to which the serrate jaws enter their respective openings.

It will be noted that the jaws 18 and 20 are located substantially in line with and between the pressure pads 32 and 34 so that they will not be subjected to off-center forces that, due to the compliant nature of the plastic material from which the clip is made, could adversely affect their reliability.

The clip of the present invention is useful for gripping various types of structures that may be interposed between the confronting walls 42 and 44 of the handles 12 and 14. A convenient application for the clip 10 concerns the gripping of wrappers such as plastic or paper bags of the type used in the retail sale of bread and other food items and of the type closed at the open end by a twist of the wrapper material surrounding such open end. Thus, in the use of the present invention, the twisted end of the wrapper is easily inserted in the space between the normally spaced-apart handles and then easily squeezed between the confronting handle surfaces as an operator squeezes the pressure pads 32 and 34 toward each other.

FIG. 2 schematically illustrates the utilization of the present invention to close the open end of a bread wrapper 46 after such open end has been twisted to form a twisted end 48. It can be noted that the squeezing together of the pressure pads 32 and 34, which are spaced substantially further from the hinge 16 than the inside walls 42 and 44, causes the hinge 16 to serve as a fulcrum to provide a substantial mechanical advantage to the squeezing of the twisted wrapper which will have been inserted between the confronting sides of the handles 12 and 14. Thus, the pressures developed gripping the twisted end of the food wrapper are, in general, greater than the finger pressures that must be applied to the pressure pads 32 and 34 when using the device of the present invention to grip the twisted end of a food wrapper.

One of the advantages of the present invention is that, when the food wrapper has been gripped by the squeezing pressures applied to the pressure pads 32 and 34, the twisted wrapper is prevented from becoming untwisted and is, for all practical purposes, securely sealed. This secure seal results because the sloping teeth 22 and 24 resist any tendency of the serrate jaws to slide apart. Thus, the only practical means to release the grip of the handles on a twisted food package is to slide the serrate jaws transversely, one relative to the other, so that the serrations of one jaw are slid laterally off the serrations of the opposite jaw.

To enable such lateral sliding movement, the handle 14 supports, with the aid of the post 40 and arcuate rib 28, an upstanding flange 30. This upstanding flange 30 is molded as one piece with the arcuate rib 28 and extends along the entire length of that rib. The flange 30 serves as a pressure-receiving surface which can receive transversely directed pressures applied for the purpose of sliding the serrations 24 laterally off the serrations 22. Thus, FIG. 6 shows with arrows the application of a lateral leftward pressure to the handle 12 supporting the jaw 18 and a rightward lateral pressure to the flange 30 mounted on the jaw 20. It will be noted that, for such lateral sliding motion to occur, the plastic comprising the device being described must comprise a non-rigid and, thus, a yieldable plastic material. Preferably the plastic is a thermoplastic such as nylon or polycarbonate and those skilled in the art will recognize that numerous other thermoplastics will be suitable.

While the present invention has been described with particular reference to twisted food sacks or bags which are typically of a thin foil, paper or plastic construction, it will occur quickly to those skilled in the art that the present invention has utility in gripping, sealing, and storing numerous types of twistable fabrics, foils, tubes, and the like and is, in general, applicable to the pinching or gripping of numerous types of structures.

Figure 8:
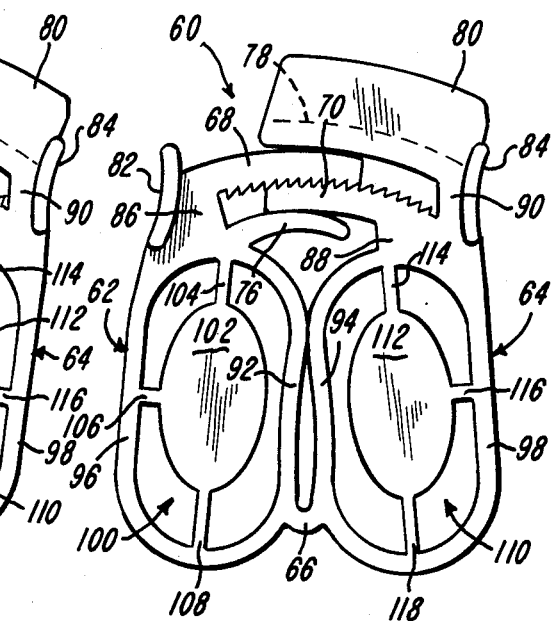
FIG. 8 is a plan view similar to FIG. 4, but illustrating the clip of the embodiment of FIG. 7 when closed.

FIGS. 7 and 8 show a modified clip, generally designated 60, which is similar to the embodiment of FIGS. 1 to 6, and is used in the same manner. Thus, the clip 60 comprises a one-piece molded plastic body having a pair of finger or hand engageable handles 62 and 64, each having a body formed from a ribbon of plastic as a closed loop and a generally rectangular, but somewhat oval, shape, comprising two, longer, substantially straight, mutually parallel inside walls, designated 92 and 94, respectively, and outside walls, designated 96 and 98, respectively. Two, shorter, arcuate or semicircular end walls join to the opposite ends of the side walls. The inside wall 92 of the handle 12 is closely adjacent to and confronting the inside wall 94 of the other handle 64. The handles 62 and 64 are linked by a flexible hinge 66 molded in one piece therewith. As with the first embodiment, the hinge 66 comprises a short, arcuate ribbon of plastic joining the two handles 62 and 64 at the lower ends of their adjacent inside walls 92 and 94 and so constructed that the handles 62 and 64 are positioned relative to one another with the upper and lower faces of one handle substantially coplanar with the corresponding faces of the other handle. Disposed on the top part of the handle 62 is a serrate jaw 68 spaced above the handle 62 by a molded post 86 that extends generally above the outside wall of the handle 62. The post 86 establishes a fixed separation between the serrate jaw 68 and the upper curved end of the handle 62.

Also formed as one piece with the post 86 is an arcuate rib 76 which defines an opening between itself and the serrate jaw 68. The rib 76 and the serrate jaw 68 are each curved so as to follow a circular curve generated about an axis which is approximately coincident with the axis about which the hinge 66 flexes, with the circular curve for the serrate jaw 68 being at a greater distance from the hinge axis than is the arcuate rib 76.

Formed atop the handle 64 is a second serrate jaw 70 supported by a post 88. Projecting outwardly adjacent the post 88 is a taller post 90 that extends generally above the outside wall of the handle 64 and that supports an arcuate rib 78. As was the case with the serrate jaw 68 and the rib 76, the serrate jaw 70 and the rib 78 follow similar but spaced-apart curves, each generated approximately about the axis of the hinge 66.

The arrangement is such that the serrate jaw 68 can enter the space between the rib 78 and the serrate jaw 70. This clip is used in precisely the same manner as the clip of the first embodiment, pressure pads 82 and 84 being provided on the posts 86 and 90 for the same purpose as the pressure pads 32 and 34 of the first embodiment. The pressure pads 82 and 84 have arcuately concave outwardly facing surfaces so that they may more comfortably be engaged by hand than the corresponding pressure pads 32 and 34 of the first embodiment. Molded on top of the arcuate rib 78 is a flange 80 for releasing the grip of the clip on an article, which thus performs the same function as the flange 30.

The clip 60 of the embodiment of FIGS. 7 and 8 was developed to overcome a problem that may occur with the use of the clip of FIGS. 1 to 6, namely that one could insert the tips of one's thumb and forefinger into the handle loops and directly squeeze on the inside walls in order to grip an article, thereby failing to use the designed mechanical advantage obtaining from the lever system described above. Accordingly, the clip 60 is provided with means for preventing or discouraging such manipulation of the clip. Such means may comprise, as illustrated, barriers substantially closing the openings in the handle loops. Thus, a spider 100 is molded inside the loop of the handle 62, the spider 100 including a center body 102 connected by radiating spokes 104, 106 and 108 connected, respectively, to the upper wall, the outside wall, and the lower wall of the handle loop. The handle 64 is similarly provided with a spider 110 having a center portion 112 and spokes 114, 116, and 118.

Although the purpose of the spiders 100 and 110 is to prevent or discourage one from directly engaging the inside walls 92 and 94 in order to squeeze the clip about an article, the spiders 100 and 110 are not directly connected to the inside walls 92 and 94 so that they may flex, as shown in FIG. 8, as needed to permit the inside walls to respond to the clamping pressure created upon closure of the clip. The spiders should, however, occupy a large enough portion of the handle loops to provide an effective barrier to discourage an effort to apply squeezing pressures directly to the inside walls 92 and 94. As an alternative, it will be apparent that the entire area of both handle loops could be filled by a web, or as another alternative, the handles could be made in the form of plate-like solids. For optimum performance, the handles 12 should be flexible, at least adjacent their inside walls, to flex in response to the clamping pressures applied. It should be noted that, although flexible handles are considered preferable regardless of how they are made, handles made from a relatively inflexible plastic may be satisfactory for some purposes.

The upstanding flanges 30 and 80 provide relatively large surfaces upon which information may be imprinted or embossed. Since the opening of a closed clip is obtained by a twisting of one handle relative to the other, the legend "Twist to Open" may advantageously be embossed on the flanges 30 and 80.

In may also be noted that the spiders 100 and 110 could take various shapes as may enhance the appearance of the clip, and the spiders or other barriers could be imprinted or in the shape of company symbols or trademarks or the like so that the clips of this invention may be utilized for advertising purposes.

In the preferred embodiments, the closed loop handles 12 and 14 are molded to a thickness of approximately 0.07" and a width of approximately 0.3". The handle loops have an outside height of approximately 1.5" and an outside width of approximately 1". The radius about which the serrations of the left jaw are curved is approximately 1.68" and the radius about which the serrations of the right jaw are curved is approximately 1.65" with the separation between the left jaw and the underlying arcuate rib 26 being approximately 1.9" and with the separation between the right jaw and its outwardly spaced arcuate rib 28 being approximately 0.15".

Although the preferred embodiments of this invention has been described, it will be understood that various changes may be made within the scope of the appended claims.

Having thus described my invention, I claim:

1. A one-piece reusable clip comprising:
   a first handle having spaced sidewalls comprising an outside wall and an inside wall, and having spaced upper and lower walls joining respectively to the upper and lower ends of said sidewalls;
   a second handle having spaced sidewalls comprising an outside wall and an inside wall, and having spaced upper and lower walls joining respectively to the upper and lower ends of said last mentioned sidewalls, said inside wall of said second handle being adjacent and confronting said inside wall of said first handle;
   hinge means interconnecting said handles joining to said inside walls and providing a fulcrum for permitting said handles to be squeezed toward one another to grip an article between said inside walls;
   manually engagable means for transmitting a squeezing pressure to said inside walls with a mechanical advantage; and
   manually releasable retaining means for holding said inside walls gripped to an article.

2. The reusable clip of claim 1 wherein said hinge means comprises an arcuate ribbon joining to the lower ends of said inside walls.

3. The reusable clip of claim 2 wherein said manually engagable means comprises a first manually-engagable, pressure-receiving means on said first handle located further from said hinge means than said inside wall of said first handle, and a second manually-engagable, pressure-receiving means on said second handle located further from said hinge means than said inside wall of said second handle.

4. The reusable clip of claim 3 wherein each of said handles has a post extending generally above said outside wall thereof, and said pressure-receiving means comprises outwardly facing pressure pads on said posts, said pressure pads being located generally above said outside walls.

5. The reusable clip of claim 1 wherein said retaining means comprises:
   a first jaw integral with said first handle and generated generally circularly about the bending axis of said hinge;
   a plurality of serrations spaced along the circular curvature of said first jaw;
   a second jaw integral with said second handle; and
   at least one serration formed on said second jaw for fitting between adjacent ones of the serrations of said first jaw.

6. The reusable clip of claim 5 wherein said retaining means further includes manually engageable release means adjacent one of said jaws for moving said one of said jaws laterally with respect to the other of said jaws to release said jaws from one another to thereby release the grip of said inside walls on the article.

7. The reusable clip of claim 6 wherein said release means comprises a pressure-receiving flange projecting upwardly from said one of said jaws.

8. The reusable clip of claim 5 including an arcuate rib for each of said jaws and means supporting each arcuate rib in spaced relation to its adjacent jaw to define an opening to receive the non-adjacent jaw.

9. The reusable clip of claim 8 further comprising a pair of posts, one for each of said handles, projecting generally above the outside walls of said handles, and outwardly facing pressure pads on said posts.

10. The reusable clip of claim 9 wherein said jaws are located generally between said pressure pads.

11. The reusable clip of claim 1 in which the material of said one piece is a plastic.

12. The reusable clip of claim 11 wherein said plastic is selected from the group consisting of nylon and polycarbonate plastic.

13. The reusable clip of claim 1 wherein said hinge comprises a twistable material whereby, without breaking said clip, one handle may be twisted out of the plane occupied by the other handle.

14. A one-piece reusable clip comprising:
   a first handle comprising a closed loop having spaced sidewalls comprising an outside wall and an inside wall, and having spaced upper and lower walls joining respectively to the upper and lower ends of said sidewalls;
   a second handle comprising a closed loop having spaced sidewalls comprising an outside wall and an inside wall, and having spaced upper and lower walls joining respectively to the upper and lower ends of said last mentioned sidewalls, said inside wall of said second handle being adjacent and confronting said inside wall of said first handle;
   hinge means interconnecting said handles joining to said inside walls and providing a fulcrum for permitting said handles to be squeezed toward one another to grip an article between said inside walls;
   manually engageable means for transmitting a squeezing pressure to said inside walls with a mechanical advantage; and
   manually releasable retaining means for holding said inside walls gripped to an article.

15. The reusable clip of claim 14 wherein each of said handles further comprises means within said loop for rendering it difficult for one to use the tips of the thumb and forefinger to directly apply a squeezing pressure to said inside walls.

16. The reusable clip of claim 15 wherein said last mentioned means comprises a spider located within said loop.

17. The reusable clip of claim 16 wherein said loop has end walls, and wherein said spider is connected to said end walls and to said outside wall but spaced from said inside wall so that said inside walls may flex as said clip is closed.

* * * * *